United States Patent

Seckerson

[15] 3,678,797
[45] July 25, 1972

[54] FASTENER
[72] Inventor: Clifford A. Seckerson, Iver Heath, England
[73] Assignee: TRW Inc., Cleveland, Ohio
[22] Filed: July 2, 1970
[21] Appl. No.: 51,878

[30] Foreign Application Priority Data

July 3, 1969 Great Britain.....................33,692/69

[52] U.S. Cl..............................................85/5 R, 24/73 HS
[51] Int. Cl...................................F16b 13/04, F16b 19/00
[58] Field of Search....................85/5, 80; 24/73 HS, 73 PF, 24/73 MF, 73.8 P, 213 R, 214, 208 A; 248/71, 73

[56] References Cited

UNITED STATES PATENTS

| | | | |
|---|---|---|---|
| 3,423,055 | 1/1969 | Fisher | 85/80 X |
| 3,093,874 | 6/1963 | Rapata | 85/5 R X |
| 3,485,133 | 12/1969 | Rapata | 85/5 R |
| 3,181,411 | 5/1965 | Mejlso | 85/5 R |
| 3,550,217 | 12/1970 | Collyer | 85/5 R X |

FOREIGN PATENTS OR APPLICATIONS 84,950  3/1965  France.....................................85/5 R

*Primary Examiner*—Ramon S. Britts
*Attorney*—Philip E. Parker, Gordon Needleman, James R. O'-Connor and Hall and Houghton

[57] ABSTRACT

A resilient fastener comprising a head and a shank which is mountable in a workpiece formed with a circular aperture. The shank comprises a substantially flat and rigid stem, which is integral with the head and which extends lengthwise of the shank in a plane containing the longitudinal axis of the shank. Extending lengthwise of the shank on opposite sides of the stem are two resilient tongues each of which is joined to the stem along one longitudinal edge and each of which has a free longitudinal edge which is flexible towards the stem in a plane perpendicular to the plane of the stem. Preferably, an outwardly projecting rib is provided extending lengthwise along the free longitudinal edge of each tongue and each rib is shouldered adjacent the head.

8 Claims, 6 Drawing Figures

PATENTED JUL 25 1972

3,678,797

INVENTOR
Clifford Alexander Seckerson
by James R. O'Connor
Attorney

FASTENER

BACKGROUND OF THE INVENTION

The present invention relates to a resilient fastener having a head and a shank which projects from the head and which is adapted to be mounted in an apertured support.

It is known to provide a fastener comprising a head and a shank, in which the shank comprises a substantially flat stem and two wings extending outwardly from opposite sides of the stem at right angles thereto. In cross section the shank is cruciform in shape and both the stem and the wings are substantially flat and taper towards the tip of the shank. In use, the shank is forced through a circular aperture in a support and the stem and wings are compressed in a radial sense so that the shank is a friction fit in the aperture. This type of fastener has the disadvantage that the stem and the wings are resistant to compression in a radial sense and it is therefore difficult to obtain the desired degree of resilience and flexibility in the shank.

It is also known to provide a resilient fastener comprising a head and a shank which is approximately oval, seen in a plane perpendicular to the longitudinal axis of the shank, and which is formed with a longitudinal recess opening out of one side of the shank and one or more longitudinal recesses opening out of the other side of the shank. The recesses render the shank flexible, in a plane perpendicular to the longitudinal axis of the shank, in a concertina fashion which facilitates the mounting of the fastener in a circular aperture in a support. However, problems can arise in the moulding of this type of fastener and in use there is a tendency, under certain working conditions for the rim of the aperture in the support to damage the longitudinal edges of the shank as the shank is inserted through the aperture.

It is an object of the present invention to provide a resilient fastener which obviates, or substantially reduces the above described problems which are associated with known fasteners of this type.

STATEMENT OF THE INVENTION

A resilient fastener comprising a head and a shank, in which the shank comprises a solid substantially flat stem extending lengthwise of the shank and containing the axis of the shank and two flexible tongues extending lengthwise of the shank one on each side of the stem, wherein each tongue is joined along one of its longitudinal edges to the stem, the other longitudinal edge is spaced laterally from a side face of the stem and is formed with an external rib having an outwardly facing bearing surface, the said other edges of the tongues being flexible towards the stem whereby the outwardly facing bearing surfaces of the two tongues are movable radially inwardly of the shank in a plane generally perpendicular to the plane of the stem and containing the axis of the shank, the maximum distance between the bearing surfaces being substantially greater than the maximum width of the stem.

DESCRIPTION OF THE PREFERRED EMBODIMENTS

Figure 1:
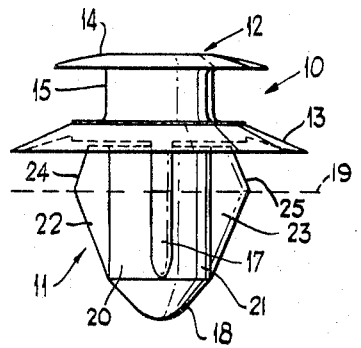
FIG. 1 is a front elevation of a fastener according to the invention.
Figure 2:
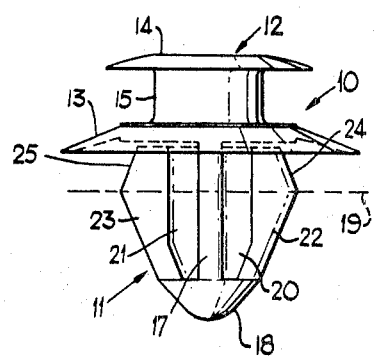
FIG. 2 is a rear elevation of FIG. 1.
Figure 3:
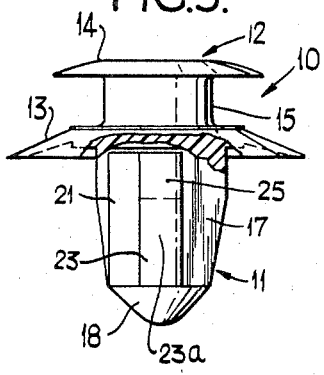
FIG. 3 is a side elevation, partly in section, of FIG. 1.

In FIGS. 1 to 5, a fastener is indicated generally at 10 which is formed from any suitable synthetic plastics material, such as an acetal resin, preferably by injection moulding.

The fastener 10 comprises a shank 11 and a head 12 which comprises a resilient annular skirt 13 adjacent the shank 11 and a circular flange 14 which is spaced from the skirt 13 by a cylindrical neck portion 15.

Figure 4:
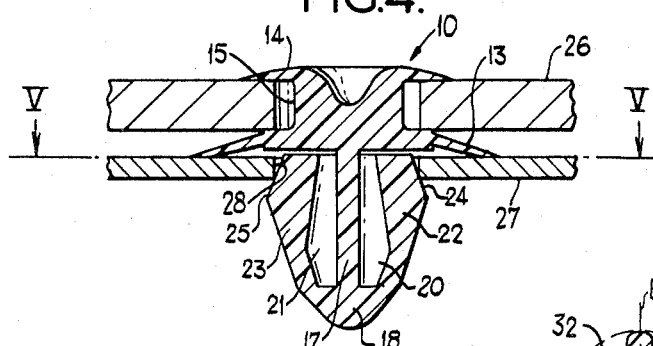
FIG. 4 is an elevation, in section, showing the fastener of FIGS. 1 to 3 attaching a trim-pad to an apertured support panel.

The skirt 13, flange 14 and neck portion 15, which are adapted to engage in a slot in a trim-pad, as shown in FIG. 4 are known and do not form a part of the present invention. For instance, the flange and the neck portion can, if required, be replaced by means for engaging a cable or a pair of upwardly directed flanges adapted to engage within a moulding. Alternatively, the head 12 can be formed as a solid button head if the fastener is designed for use as a closure or stud.

The shank 11 comprises a solid substantially flat stem 17 which extends lengthwise of the shank from the head 12 to the tip 18 of the shank and which contains the longitudinal axis of the shank. The tip 18 of the shank is solid and integral with the stem 17, which is of constant width in the region adjacent the head 12 up to a point 19, and which tapers from the point 19 towards the tip 18. This is seen best from FIG. 3.

The shank 11 includes two flexible tongues 20 and 21 which also extend lengthwise of the shank one on each side of the stem 17. The tongues 20, 21 are each joined along one longitudinal edge, to opposite faces of the stem 17 and each tongue has a free longitudinal edge which is spaced laterally from the stem and which is formed externally with a rib 22 and 23 respectively. The two tongues 20, 21 are arcuately curved, as seen in a plane perpendicular to the longitudinal axis of the shank so as to form an open-sided tube which is divided by the stem 17. The free edges of the tongues 20, 21 which carry the ribs 22 and 23 are movable radially inwardly of the shank towards the stem 17 in a longitudinal plane $a$ which is generally perpendicular to the plane $b$ of the stem and which contains the axis of the stem.

The outer surface 22a, 23a of each rib 22 and 23 acts as a bearing surface and is convexly curved as seen in a plane perpendicular to the axis of the shank. The outer bearing surfaces 22a and 23a slope outwardly and away from the stem, in the region of the head 12 to form sloping shoulders 24 and 25, and thereafter taper inwardly towards the tip 18 of the shank.

The tongues 20 and 21 are joined integrally to the tip 18 of the shank but terminate short of the head 12 so as to increase the amount of radial movement obtainable at the shoulders 24 and 25. It will be apparent that the tongues 20 and 21 can be joined both to the head and the tip, but this increases their stiffness and resistance to compression. Alternatively, the tongues can be free at both ends, i.e., they can terminate short of both the head 12 and the tip 18 so as to maximize their flexibility and lateral movement.

Figure 5:
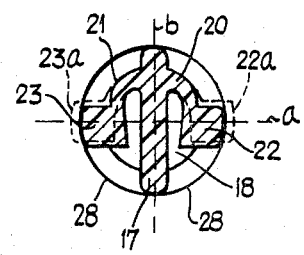
FIG. 5 is a section taken on the line V—V of FIG. 4

The fastener 10 is used, as shown in FIGS. 4 and 5, to attach a trim-pad 26 to an apertured panel 27. The panel 27 is formed with a circular aperture 28, the diameter of which is the same as, or slightly less than, the width of the stem 17 adjacent the head 12. As can be seen from FIG. 5, the maximum distance between shoulders 24, 25 is substantially greater than the width of the stem and the diameter of the aperture 28. As the shank 11 of the fastener is forced through the aperture 28 the stem 17 acts as a guide for the shank to centralize the shank in the aperture and the flexible tongues 20, 21 are forced inwardly as the shoulders 24, 25 pass through the aperture. When the shank is engaged in the aperture 28, with the skirt 13 flattened slightly against the upper surface of the panel 27, the shoulders 24, 25 engage behind the support 27 with the tongues 20, 21 compressed inwardly to place the shank under tension. This ensures a firm, rattle-free connection between the fastener 10 and the support 27.

The trim pad 26 can be engaged between the flange 14 and the skirt 13 of the fastener either before the fastener 10 is attached to the panel or afterwards, depending upon the manner of attachment.

If at any time it is necessary to remove the fastener 10 from the aperture 28 in the panel 27, the stem 17 ensures that the fastener is withdrawn in a direction normal to the surface of the panel 27 and without tilting. This produces a more consistent pull-off load and reduces the risk of damage to the fastener 10 when it is removed from the panel. As can be seen from FIG. 5, the bearing surface on each rib 22, 23 is convexly curved on a radius approximately equal to, or slightly less than the radius of the aperture 28 so that, when the tongues are compressed and located within the aperture, the bearing surface of each rib 22, 23 fits snugly within the aperture.

Figure 6:
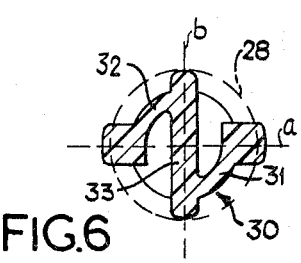
FIG. 6 is a view similar to FIG. 5, illustrating a modification of the fastener of FIGS. 1 to 3.

A modification of the fastener 10 is indicated generally at 30 in FIG. 6. The fastener 30 is similar to the fastener 10 in all respects except insofar as it has tongues 31 and 32 which are joined to a stem 33 on opposite sides of the stem and at opposite lateral ends of the stem. Thus, the tongues 31 and 32, which are similar in all other respects to the tongues 20, 21 of the fastener 10, extend in opposite senses towards the medial longitudinal plane $a$ of the shank of the fastener 30, which is perpendicular to the longitudinal medial plane $b$ of the stem.

The fastener 30 is used in the same manner as the fastener 10 and the tongues 31, 32 are compressed in the plane $a$ as the shank of the fastener is forced through the circular aperture 28 to allow the shoulders on the tongues to pass through the aperture.

Further minor modifications can be made to the above described embodiment without departing from the spirit and scope of the invention which is best described in the following claims.

What we claim is:

1. A resilient fastener comprising a head and a shank adapted for insertion in a complementary aperture in a panel, the shank including a solid, substantially flat stem joined to the head and extending lengthwise of the shank and containing the axis of the shank, the width of the stem being substantially equal to the width of the complementary aperture in a panel adapted to receive the shank, and two flexible tongues extending lengthwise of the shank, the tongues being joined lengthwise to opposite side faces of the stem at points adjacent to but spaced inwardly toward the axis of the shank from a longitudinal edge of the stem and extending from said points of jointure with the stem to free ends lying beyond an imaginary plane extending through the axis of the shank perpendicular to the longitudinal plane of the stem but terminating inwardly of a longitudinal edge of the stem opposite the longitudinal edge of the stem proximate the said points of jointure, the tongues in the vicinity of the free ends thereof having internal faces disposed in spaced, generally parallel relationship to the opposite side faces of the stem and having external ribs formed thereon in the vicinity of the free ends thereof defining outwardly facing bearing surfaces, said bearing surfaces being spaced radially outwardly from the axis of the shank a greater distance than are the longitudinal edges of the stem, whereby the portions of the tongues having the ribs formed thereon will readily flex inwardly toward the plane of the stem containing the axis of the shank to facilitate insertion of the shank into a complementary aperture in a panel, and whereby, subsequent to insertion in the aperture in the panel, the shank will engage the edges of the panel adjacent the aperture at four substantially equiangularly spaced points.

2. A fastener according to claim 1 wherein the said tongues extend inwardly from the said points of jointure with the stem along arcuate paths as viewed in a transverse cross section of the shank.

3. A fastener according to claim 1 wherein the said tongues are connected to the head only through the stem and the ends of the tongues proximate the head are spaced, in their entirety, from the head.

4. A fastener according to claim 1 wherein the said external ribs formed on the tongues extend longitudinally from the ends of the tongues proximate the head and continuously increase in thickness to a point intermediate the length of the tongues and beyond the said point continuously decreased in thickness to the ends of the tongues remote from the head whereby an outwardly sloping shoulder is provided on each tongue between its end proximate the head and the said intermediate point, and said outwardly facing bearing surfaces progressively diverge from the axis of the shank between the last mentioned ends of the tongues and the said intermediate point.

5. A fastener according to claim 2 wherein the tongues form a radially collapsible, open ended tube bisected by the stem.

6. A fastener according to claim 1 wherein the stem and tongues terminate, at the longitudinal end of the shank remote from the head, in a solid tip.

7. A fastener according to claim 1 wherein each of the said outwardly facing bearing surfaces defined by the ribs is convexly curved as viewed in a cross section transverse the axis of the shank.

8. A fastener according to claim 1 wherein each of the tongues is joined to an opposite face of the stem adjacent to but spaced inwardly from an opposite longitudinal edge of the stem.

* * * * *